US012128688B2

(12) United States Patent
Nakano et al.

(10) Patent No.: US 12,128,688 B2
(45) Date of Patent: Oct. 29, 2024

(54) RECORDING DEVICE

(71) Applicant: SEIKO EPSON CORPORATION, Tokyo (JP)

(72) Inventors: Shuichiro Nakano, Matsumoto (JP); Daisuke Hiruma, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 112 days.

(21) Appl. No.: 17/809,569

(22) Filed: Jun. 29, 2022

(65) Prior Publication Data

US 2023/0001698 A1 Jan. 5, 2023

(30) Foreign Application Priority Data

Jul. 2, 2021 (JP) ................................. 2021-110859

(51) Int. Cl.
*B41J 2/175* (2006.01)
*B41J 2/17* (2006.01)
*B41J 29/02* (2006.01)

(52) U.S. Cl.
CPC ........... *B41J 2/1752* (2013.01); *B41J 2/1721* (2013.01); *B41J 2/17596* (2013.01); *B41J 29/02* (2013.01); *B41J 2/1742* (2024.05)

(58) Field of Classification Search
CPC ................................ B41J 2/175; B41J 2/1752
See application file for complete search history.

(56) References Cited

U.S. PATENT DOCUMENTS

2017/0253056 A1* 9/2017 Sakai ..................... B41J 15/046
2018/0178561 A1* 6/2018 Nishiyama ............... B41J 29/13

FOREIGN PATENT DOCUMENTS

JP 2011-042127 A 3/2011
JP 2021-028143 A 2/2021

* cited by examiner

*Primary Examiner* — Julian D Huffman
(74) *Attorney, Agent, or Firm* — WORKMAN NYDEGGER

(57) ABSTRACT

A recording device is a recording device receiving liquid supplied from a liquid accommodation unit, and includes a recording unit configured to eject the liquid onto a transported medium, a support unit configured to support the medium at a position facing the recording unit, a first side frame and a second side frame that are configured to support one end side and the other end side of the support unit, a coupling frame configured to couple the first side frame and the second side frame, and a holding unit configured to hold the liquid accommodation unit. The coupling frame is located below the support unit, and the holding unit is located between the support unit and the coupling frame and between the first side frame and the second side frame.

15 Claims, 6 Drawing Sheets

RECORDING DEVICE

The present application is based on, and claims priority from JP Application Serial Number 2021-110859, filed Jul. 2, 2021, the disclosure of which is hereby incorporated by reference herein in its entirety.

BACKGROUND

1. Technical Field

The present disclosure relates to a recording device, for example.

2. Related Art

As one example of a recording device, JP-A-2021-28143 describes an inkjet printer that records an image on a medium by ejecting liquid onto the medium. The inkjet printer includes an ink tank accommodation unit being one example of a holding unit. The ink tank accommodation unit holds an ink tank being one example of a liquid accommodation unit that accommodates liquid. The inkjet printer performs recording on the medium by supplying the liquid from the ink tank.

In the recording device described in JP-A-2021-28143, the holding unit is installed on a floor on which a main body of the recording device is installed. In this case, an installation space for the holding unit is required in addition to an installation space for the main body. Meanwhile, when the holding unit is attached to the main body, there may be a risk of increasing the size of the recording device. Therefore, in order to suppress increase of the size of the recording device, there is room for improvement regarding the position of the holding unit.

SUMMARY

A recording device that solves the above-mentioned problem is a recording device receiving liquid supplied from a liquid accommodation unit configured to accommodate the liquid, the recording device including: a recording unit configured to eject the liquid onto a medium being transported to perform printing on the medium; a support unit configured to support the medium at a position facing the recording unit; a first side frame configured to support one end side of the support unit; a second side frame configured to support another end side of the support unit; a coupling frame configured to couple the first side frame and the second side frame to each other; and one or more holding units configured to hold one or more of the liquid accommodation units, wherein the coupling frame is located below the support unit, and the one or more holding units are located between the support unit and the coupling frame and between the first side frame and the second side frame.

DESCRIPTION OF EXEMPLARY EMBODIMENTS

One exemplary embodiment of a recording device is described below with reference to the accompanying drawings. The recording device is, for example, an ink jet-type printer that records an image such as characters and photographs on a medium such as a sheet and fiber by ejecting ink, which is an example of liquid.

Figure 1:
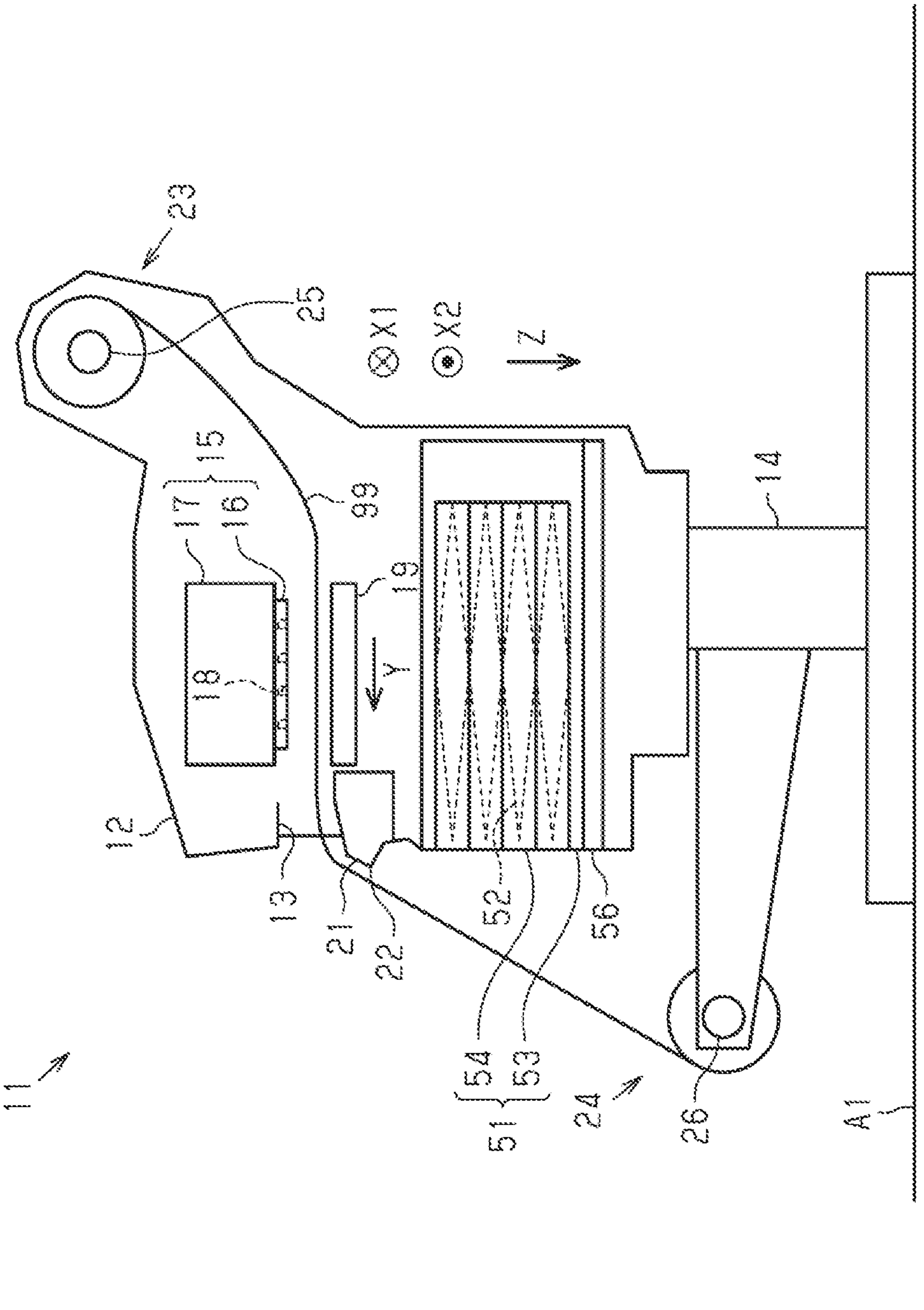
FIG. 1 is a side view illustrating a recording device according to one exemplary embodiment.

As illustrated in FIG. 1, a recording device 11 includes a housing 12. A discharge port 13 is formed in the housing 12. The discharge port 13 is an opening through which a medium 99 after recording is discharged from the housing 12.

In this example, the recording device 11 includes a leg unit 14. The leg unit 14 supports the housing 12. The leg unit 14 is removably attached to the recording device 11. The leg unit 14 is in contact with an installation surface A1 on which the recording device 11 is installed.

The recording device 11 includes a recording unit 15. The recording unit 15 is accommodated in the housing 12. The recording unit 15 is configured to eject liquid onto the medium 99. An image is recorded on the medium 99 when the recording unit 15 ejects the liquid onto the medium 99.

In this example, the recording unit 15 includes a head 16 and a carriage 17. The head 16 includes one or more nozzles 18. The head 16 ejects the liquid from the nozzles 18. The carriage 17 includes the head 16 mounted thereto. The carriage 17 scans the medium 99. Specifically, the carriage 17 moves in a first direction X1 and a second direction X2 in the housing 12. With this, the head 16 ejects the liquid over the width of the medium 99. In this manner, the recording device 11 in this example is a serial printer. The recording device 11 may be a line printer capable of ejecting the liquid simultaneously over the width of the medium 99.

In this example, the first direction X1 is a direction in which the carriage 17 moves away from a home position. The second direction X2 is a direction opposite to the first direction X1. In this example, the second direction X2 is a direction in which the carriage 17 moves while approaching the home position. The home position is a position at which the carriage 17 is at a stand-by mode when the head 16 does not eject the liquid onto the medium 99. When the recording device 11 is a line printer, the first direction X1 or the second direction X2 is a longitudinal direction of the recording unit 15.

The recording device 11 includes a support unit 19. The support unit 19 is accommodated in the housing 12. The support unit 19 is located at a position facing the recording unit 15. The support unit 19 is located below the recording unit 15.

The support unit 19 supports the medium 99 being transported. Specifically, the support unit 19 supports the medium 99 that is transported in a transport direction Y, from below. The recording unit 15 ejects the liquid onto a part of the medium 99, which is supported by the support unit 19. In this example, the transport direction Y is a direction in which the medium 99 moves on the support unit 19. The transport direction Y is a direction different from any one of the first direction X1, the second direction X2, and a vertical direction Z.

The recording device 11 includes a discharge support unit 21. The discharge support unit 21 supports the medium 99 after recording performed by the recording unit 15. Thus, the discharge support unit 21 is located downstream of the support unit 19 in the transport direction Y. A part of the discharge support unit 21 extends from the inside of the housing 12 to the outside of the housing 12 through the discharge port 13. The discharge support unit 21 includes a protrusion portion 22 that protrudes in the transport direction Y. In this example, the protrusion portion 22 is a downstream end of the discharge support unit 21 in the transport direction Y.

The recording device 11 includes one or more medium holding units. In this example, the recording device 11 includes two medium holding units. Specifically, the recording device 11 includes a first medium holding unit 23 and a second medium holding unit 24. In this example, the medium 99 is transported from the first medium holding unit 23 to the second medium holding unit 24. The recording unit 15 performs recording in a process of transporting the medium 99 from the first medium holding unit 23 to the second medium holding unit 24.

The first medium holding unit 23 holds the medium 99 before recording performed by the recording unit 15. In this example, the first medium holding unit 23 holds the medium 99 wound in a roll-like shape. The first medium holding unit 23 includes a feeding shaft 25. In the first medium holding unit 23, the medium 99 is wound about the feeding shaft 25. The medium 99 is fed out by rotation of the feeding shaft 25. In this example, the first medium holding unit 23 is located upstream of the recording unit 15 in the transport direction Y. In this example, the first medium holding unit 23 is accommodated in the housing 12.

The second medium holding unit 24 holds the medium 99 after recording performed by the recording unit 15. In this example, the second medium holding unit 24 holds the medium 99 wound in a roll-like shape. The second medium holding unit 24 includes a winding shaft 26. In the second medium holding unit 24, the medium 99 is wound about the winding shaft 26. The medium 99 is wound by rotation of the winding shaft 26.

In this example, the second medium holding unit 24 is attached to the leg unit 14. In other words, the second medium holding unit 24 is located outside of the housing 12. The second medium holding unit 24 may be accommodated in the housing 12. In this example, the second medium holding unit 24 is located downstream of the first medium holding unit 23 in the transport direction Y. In this example, the second medium holding unit 24 is located downstream of the recording unit 15 in the transport direction Y.

In this example, the first medium holding unit 23 and the second medium holding unit 24 transport the medium 99. The recording device 11 may additionally include a transport unit such as a roller and a belt for transporting the medium 99.

In this example, the recording device 11 performs recording on the medium 99 having a continuously elongated shape. The recording device 11 may perform recording on the medium 99 in a cut form, instead of the elongated medium 99. In this case, for example, the first medium holding unit 23 may include a cassette that accommodates the medium 99 before recording. For example, the second medium holding unit 24 may include a tray on which the medium 99 after recording is stacked. The recording device 11 may perform recording on the medium 99 inserted into the housing 12 by a user, instead of the medium 99 fed out from the first medium holding unit 23.

Figure 2:
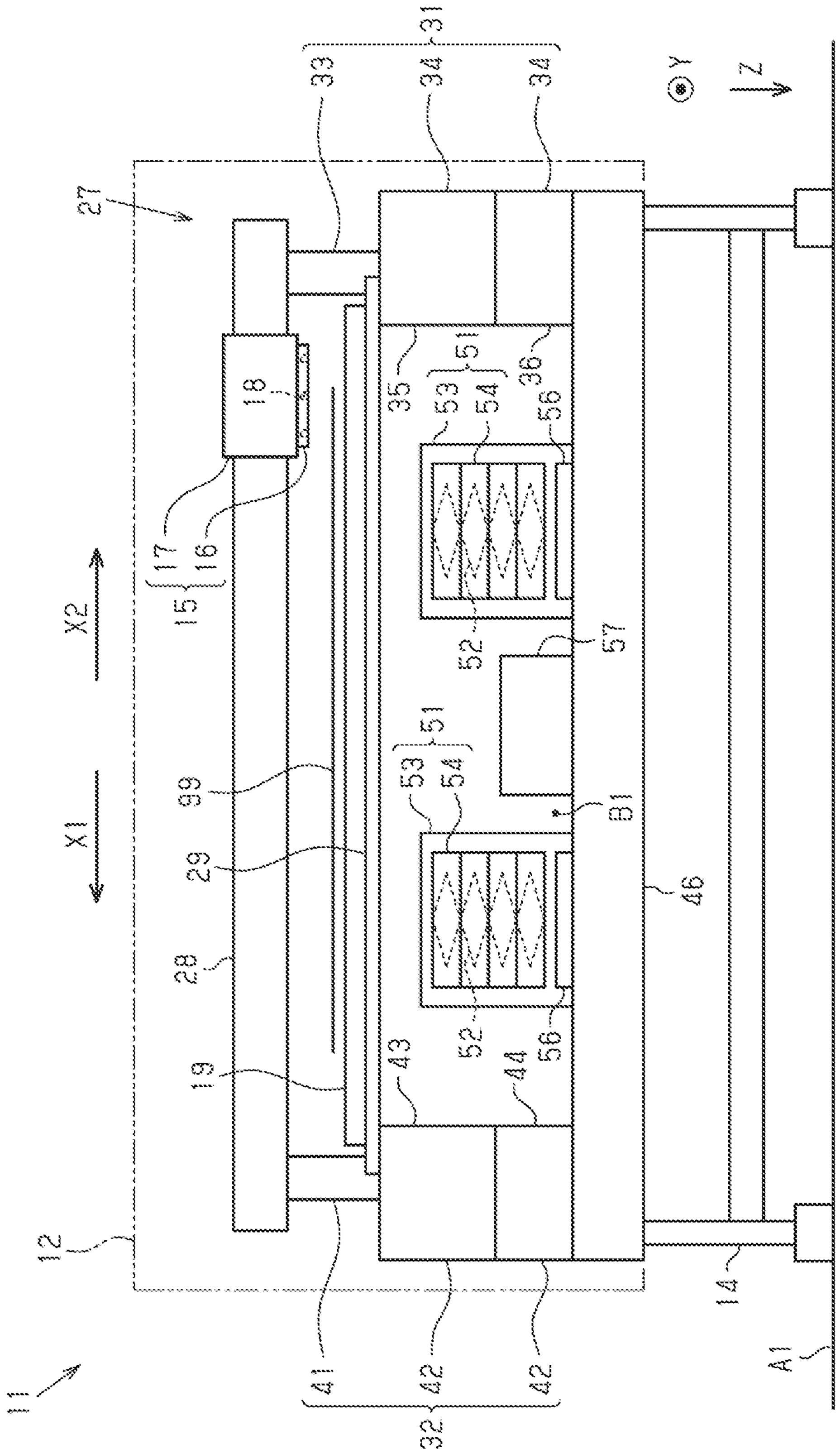
FIG. 2 is a front view of the recording device.

As illustrated in FIG. 2, the recording device 11 includes a main body frame 27. In this example, the housing 12 and the leg unit 14 are attached to the main body frame 27.

The main body frame 27 includes a main frame 28. The main frame 28 is a frame that supports the recording unit 15. In this example, the main frame 28 supports the carriage 17. The main frame 28 is elongated in a direction X containing the first direction X1 and the second direction X2. In this example, the first direction X1 is a direction from one end of the main frame 28 to the other end of the main frame 28. The carriage 17 is attached to the main frame 28. The carriage 17 moves along the main frame 28. The carriage 17 moves in the first direction X1 and the second direction X2 along the main frame 28. The main frame 28 is formed of, for example, sheet metal.

The main body frame 27 includes a base frame 29. The base frame 29 is a frame that supports the support unit 19. The base frame 29 is elongated in the direction X. In this example, the first direction X1 is a direction from one end of the base frame 29 to the other end of the base frame 29. The base frame 29 is located below the support unit 19. In this example, the support unit 19 is attached to the base frame 29. The base frame 29 supports the support unit 19 from below. Therefore, the base frame 29 is located below the main frame 28. The base frame 29 is formed of, for example, sheet metal.

The main body frame 27 includes two side frames. In other words, the main body frame 27 includes a first side frame 31 and a second side frame 32. In this example, the first side frame 31 and the second side frame 32 have similar configurations.

The first side frame 31 and the second side frame 32 are located side by side in the direction X. The first side frame 31 and the second side frame 32 are located so as to sandwich the support unit 19 in the direction X.

The first side frame 31 and the second side frame 32 support the main frame 28. The first side frame 31 and the second side frame 32 support the ends of the main frame 28, respectively. The first side frame 31 and the second side frame 32 support both the ends of the main frame 28. For example, the first side frame 31 supports one end of the main frame 28, and the second side frame 32 supports the other end of the main frame 28. In other words, the main frame 28 is installed between the first side frame 31 and the second side frame 32.

In this example, the first side frame 31 and the second side frame 32 support the recording unit 15 by supporting the main frame 28. When the recording device 11 is a line printer, the first side frame 31 and the second side frame 32 may directly support the recording unit 15. In this manner, the first side frame 31 and the second side frame 32 support the recording unit 15.

The first side frame 31 and the second side frame 32 support the base frame 29. The first side frame 31 and the second side frame 32 support the ends of the base frame 29, respectively. The first side frame 31 and the second side frame 32 support both the ends of the base frame 29. For example, the first side frame 31 supports one end of the base frame 29, and the second side frame 32 supports the other end of the base frame 29. In other words, the base frame 29 is installed between the first side frame 31 and the second side frame 32.

In this example, the first side frame 31 and the second side frame 32 support the support unit 19 by supporting the base frame 29. In this example, the first side frame 31 supports one end side of the support unit 19 through intermediation of the base frame 29. The second side frame 32 supports the other end side of the support unit 19 through intermediation of the base frame 29. The one end side of the support unit 19 is a portion of the support unit 19, which is located in the second direction X2 from the center in the direction X. The other end side of the support unit 19 is a portion of the support unit 19, which is located in the first direction X1 from the center in the direction X.

The first side frame 31 and the second side frame 32 may directly support the support unit 19. In this case, the first side frame 31 supports one end of the support unit 19, and the second side frame 32 supports the other end of the support unit 19. In other words, in this case, the support unit 19 is installed between the first side frame 31 and the second side frame 32. In this manner, the first side frame 31 and the second side frame 32 support the support unit 19. More specifically, the first side frame 31 supports one end side of the support unit 19. The second side frame 32 supports the other end side of the support unit 19.

In this example, the leg unit 14 is attached to the first side frame 31 and the second side frame 32. Specifically, the leg unit 14 is attached to the lower end of the first side frame 31 and the lower end of the second side frame 32. When the leg unit 14 is removed from the first side frame 31 and the second side frame 32, the lower end of the first side frame 31 and the lower end of the second side frame 32 are in contact with the installation surface A1.

In this example, the first side frame 31 includes a first top frame 33 and one or more first bottom frames 34. In this example, the first side frame 31 includes one first top frame 33 and a plurality of first bottom frames 34. The first top frame 33 and the first bottom frames 34 are located so as to overlap with each other. The first top frame 33 and the first bottom frames 34 are arrayed in the stated order in the vertical direction Z. In other words, the first top frame 33 is located above the first bottom frames 34. The first top frame 33 is located at the uppermost position in the first side frame 31.

The first top frame 33 supports the main frame 28. Specifically, the first top frame 33 supports the end of the main frame 28. The end of the main frame 28 is attached to the first top frame 33. The first top frame 33 is attached to the first bottom frames 34. The first top frame 33 is formed of, for example, sheet metal.

The first bottom frames 34 support the first top frame 33. In this example, the plurality of first bottom frames 34 have similar configurations. The plurality of first bottom frames 34 are located so as to overlap with each other. The plurality of first bottom frames 34 are arrayed in the vertical direction Z. The first bottom frame 34 is formed of, for example, sheet metal.

In this example, the first bottom frame 34 is a box-like frame. The box-like frame is a frame having a three-dimensional structure. In this example, the box-like frame is a rectangular parallelepiped frame configured so that one surface of the six surfaces opens. The box-like frame may be a rectangular parallelepiped frame with six surfaces all of which are closed. When the first bottom frame 34 has a three-dimensional structure, rigidity of the first bottom frame 34 is improved.

In this example, the first side frame 31 includes two first bottom frames 34. In this example, the two first bottom frames 34 are referred to as a first primary bottom frame 35 and a first secondary bottom frame 36 in order to distinguish the two from each other. The first primary bottom frame 35 and the first secondary bottom frame 36 are located so as to overlap with each other. The first primary bottom frame 35 and the first secondary bottom frame 36 are arrayed in the stated order in the vertical direction Z. In other words, the first primary bottom frame 35 is located above the first secondary bottom frame 36.

In this example, the number of first bottom frames 34 is two, but may be increased to three or more. For example, a first tertiary bottom frame may be attached to the first secondary bottom frame 36. As the number of first bottom frames 34 is increased, the height of the recording device 11 is increased.

The first primary bottom frame 35 is the first bottom frame 34 that is located at the uppermost position among the plurality of first bottom frames 34. The first primary bottom frame 35 supports the first top frame 33. The first top frame 33 is attached to the first primary bottom frame 35. In this example, the first top frame 33 is attached to the upper surface of the first primary bottom frame 35.

The first primary bottom frame 35 supports the base frame 29. Specifically, the first primary bottom frame 35 supports the end of the base frame 29. The end of the base frame 29 is attached to the first primary bottom frame 35. In this example, the base frame 29 is attached to the upper surface of the first primary bottom frame 35.

The first secondary bottom frame 36 supports the first primary bottom frame 35. The first primary bottom frame 35 is attached to the first secondary bottom frame 36. In this example, the first primary bottom frame 35 is attached to the upper surface of the first secondary bottom frame 36.

In this example, the leg unit 14 is attached to the first secondary bottom frame 36. In the first side frame 31, the leg unit 14 is attached to the first bottom frame 34 that is located at the lowermost position among the plurality of first bottom frames 34. When the leg unit 14 is removed from the first secondary bottom frame 36, the first secondary bottom frame 36 is in contact with the installation surface A1.

In this example, similarly to the first side frame 31, the second side frame 32 includes a second top frame 41 and one or more second bottom frames 42. In this example, the second side frame 32 includes one second top frame 41 and a plurality of second bottom frames 42. The second top frame 41 and the second bottom frames 42 are located so as to overlap with each other. The second top frame 41 and the second bottom frames 42 are arrayed in the stated order in the vertical direction Z. In other words, the second top frame 41 is located above the second bottom frames 42. The second top frame 41 is located at the uppermost position in the second side frame 32.

In this example, the second top frame 41 has a configuration similar to that of the first top frame 33. The second top frame 41 supports the main frame 28. Specifically, the second top frame 41 supports the end of the main frame 28. The end of the main frame 28 is attached to the second top frame 41. The second top frame 41 is attached to the second bottom frames 42. The second top frame 41 is formed of, for example, sheet metal.

The second bottom frames 42 support the second top frame 41. In this example, the plurality of second bottom frames 42 have similar configurations. The plurality of second bottom frames 42 are located so as to overlap with each other. The plurality of second bottom frames 42 are arrayed in the vertical direction Z. The second bottom frames 42 is formed of, for example, sheet metal.

In this example, the second bottom frame 42 has a configuration similar to that of the first bottom frame 34. Thus, the second bottom frame 42 is a box-like frame. When the second bottom frame 42 has a three-dimensional structure, rigidity of the second bottom frame 42 is improved.

In this example, the second side frame 32 includes two second bottom frames 42. The number of second bottom frames 42 matches with the number of first bottom frames 34. In this example, the two second bottom frames 42 are referred to as a second primary bottom frame 43 and a second secondary bottom frame 44 in order to distinguish the two from each other. The second primary bottom frame 43 and the second secondary bottom frame 44 are located so as to overlap with each other. The second primary bottom frame 43 and the second secondary bottom frame 44 are arrayed in the stated order in the vertical direction Z. In other words, the second primary bottom frame 43 is located above the second secondary bottom frame 44.

In this example, the number of second bottom frames 42 is two, but may be increased to three or more. For example, a second tertiary bottom frame may be attached to the second secondary bottom frame 44. As the number of second bottom frames 42 is increased, the height of the recording device 11 is increased. When the first bottom frames 34 and the second bottom frames 42 are provided more, the height of the recording device 11 is adjusted. With this, the height of the recording device 11 can be adjusted to a height that is easily handled by a user.

The second primary bottom frame 43 is the second bottom frame 42 that is located at the uppermost position among the plurality of second bottom frames 42. The second primary bottom frame 43 supports the second top frame 41. The second top frame 41 is attached to the second primary bottom frame 43. In this example, the second top frame 41 is attached to the upper surface of the second primary bottom frame 43.

The second primary bottom frame 43 supports the base frame 29. Specifically, the second primary bottom frame 43 supports the end of the base frame 29. The end of the base frame 29 is attached to the second primary bottom frame 43. In this example, the base frame 29 is attached to the upper surface of the second primary bottom frame 43.

The second secondary bottom frame 44 supports the second primary bottom frame 43. The second primary bottom frame 43 is attached to the second secondary bottom frame 44. In this example, the second primary bottom frame 43 is attached to the upper surface of the second secondary bottom frame 44.

In this example, the leg unit 14 is attached to the second secondary bottom frame 44. In other words, the leg unit 14 is attached to the second bottom frame 42 that is located at the lowermost position among the plurality of second bottom frames 42. When the leg unit 14 is removed from the second secondary bottom frame 44, the second secondary bottom frame 44 is in contact with the installation surface A1.

The main body frame 27 includes a coupling frame 46. The coupling frame 46 is a frame that couples the first side frame 31 and the second side frame 32 to each other. In this example, one end of the coupling frame 46 is attached to the first side frame 31, and the other end of the coupling frame 46 is attached to the second side frame 32. When the coupling frame 46 is attached to the first side frame 31 and the second side frame 32, rigidity of the main body frame 27 is improved. In other words, the coupling frame 46 functions as a beam in the main body frame 27. The coupling frame 46 is formed of, for example, sheet metal. The coupling frame 46 is located below the support unit 19. The coupling frame 46 is located below the base frame 29.

The coupling frame 46 is attached to the first bottom frame 34 and the second bottom frame 42. When the plurality of first bottom frames 34 are provided, the coupling frame 46 is attached to the first bottom frames 34 that is located at the lowermost position among the plurality of first bottom frames 34. In this example, the coupling frame 46 is attached to the first secondary bottom frame 36. When the plurality of second bottom frames 42 are provided, the coupling frame 46 is attached to the second bottom frame 42 that is located at the lowermost position among the plurality of second bottom frames 42. In this example, the coupling frame 46 is attached to the second secondary bottom frame 44.

Figure 3:
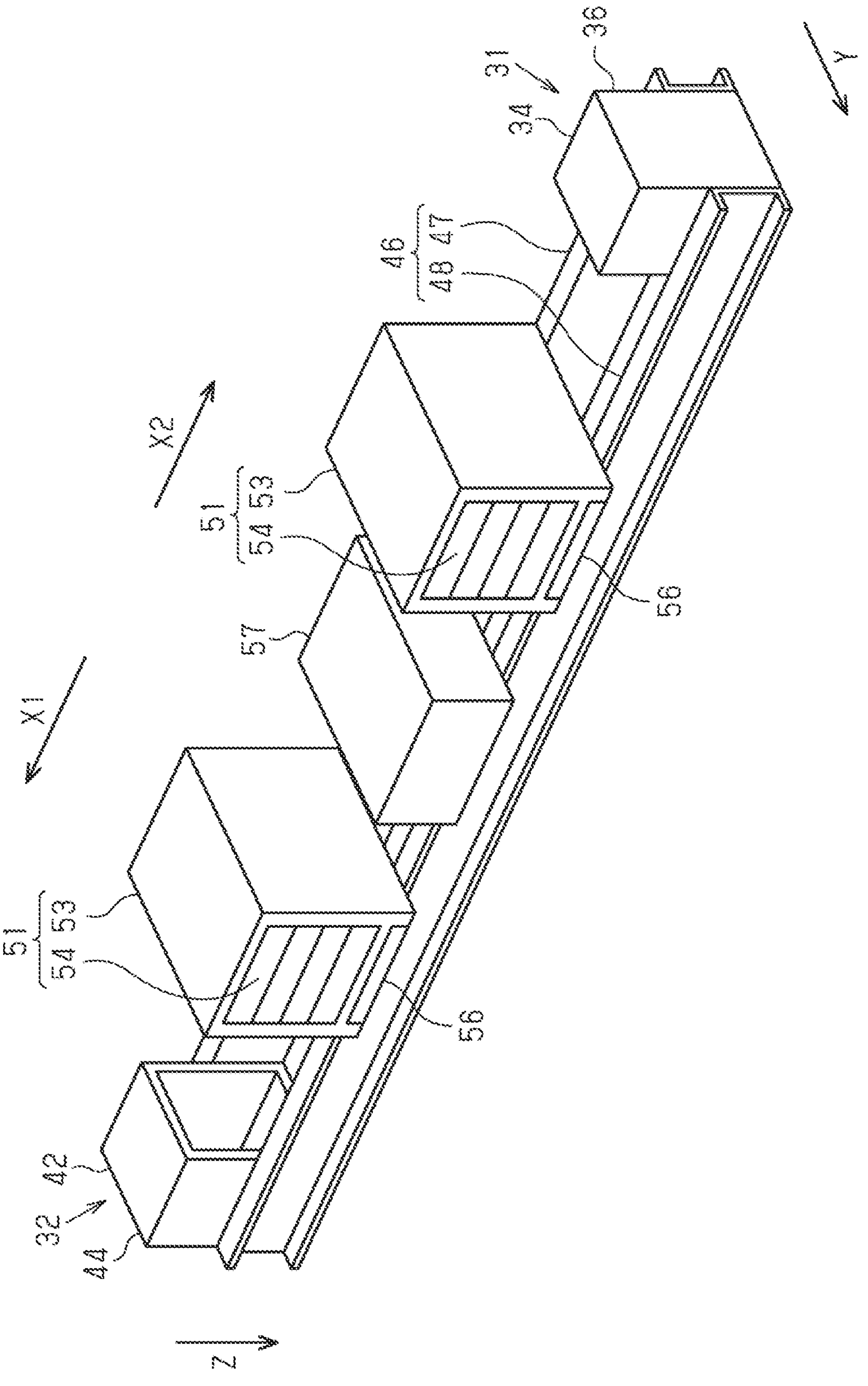
FIG. 3 is a perspective view of a holding unit.

As illustrated in FIG. 3, in this example, the coupling frame 46 includes a first beam frame 47 and a second beam frame 48. The first beam frame 47 and the second beam frame 48 are located so as to sandwich the first side frame 31 and the second side frame 32 in the transport direction Y. Specifically, the first beam frame 47 and the second beam frame 48 are located so as to sandwich the first bottom frame 34 and the second bottom frame 42 in the transport direction Y. In this example, the first beam frame 47 and the second beam frame 48 are configured to have a C-like cross-sectional shape.

The first beam frame 47 is located upstream of the first bottom frame 34 and the second bottom frame 42 in the transport direction Y. When the first side frame 31 includes the plurality of first bottom frames 34, the first beam frame 47 is attached to the first bottom frame 34 that is located at the lowermost position among the plurality of first bottom frames 34. In this example, the first beam frame 47 is attached to the first secondary bottom frame 36. When the second side frame 32 includes the plurality of second bottom frames 42, the first beam frame 47 is attached to the second bottom frame 42 that is located at the lowermost position among the plurality of second bottom frames 42. In this example, the first beam frame 47 is attached to the second secondary bottom frame 44.

The second beam frame 48 is located downstream of the first bottom frame 34 and the second bottom frame 42 in the transport direction Y. When the first side frame 31 includes the plurality of first bottom frames 34, the second beam frame 48 is attached to the first bottom frame 34 that is located at the lowermost position among the plurality of first bottom frames 34. In this example, the second beam frame 48 is attached to the first secondary bottom frame 36. When the second side frame 32 includes the plurality of second bottom frames 42, the second beam frame 48 is attached to the second bottom frame 42 that is located at the lowermost position among the plurality of second bottom frames 42. In this example, the second beam frame 48 is attached to the second secondary bottom frame 44.

As illustrated in FIG. 2, a sectional region B1 is formed in the recording device 11. In this example, the sectional region B1 is a region defined by the base frame 29, the first side frame 31, the second side frame 32, and the coupling frame 46. In other words, the sectional region B1 is a region between the base frame 29 and the coupling frame 46 and between the first side frame 31 and the second side frame 32. The sectional region B1 is located between the support unit 19 and the coupling frame 46 and between the first side frame 31 and the second side frame 32. When the first side frame 31 and the second side frame 32 directly support the support unit 19, the sectional region B1 is a region defined by the support unit 19, the first side frame 31, the second side frame 32, and the coupling frame 46. In order to suppress increase of the size of the recording device 11, it is preferred that the sectional region B1 be utilized.

The recording device 11 includes one or more holding units 51. In this example, the recording device 11 includes two holding units 51. The holding unit 51 holds one or more liquid accommodation units 52. The holding unit 51 is coupled to the recording unit 15 via a tube, for example.

Through the tube, the liquid is supplied from the liquid accommodation unit 52 to the recording unit 15.

In this example, the holding unit 51 holds the plurality of liquid accommodation units 52 in a stacked state in the vertical direction Z. The holding unit 51 holds four liquid accommodation units 52. Thus, in this example, the recording device 11 holds eight liquid accommodation units 52.

The two holding units 51 may be configured to hold the different numbers of liquid accommodation units 52. For example, one holding unit 51 may be configured to hold four liquid accommodation units 52, whereas the other holding unit 51 may be configured to hold two liquid accommodation units 52. In this case, the recording device 11 holds six liquid accommodation units 52.

In this example, the holding unit 51 includes a case 53 and one or more holding trays 54. The case 53 holds one or more holding trays 54. In this example, the case 53 holds four holding trays 54 in a stacked state in the vertical direction Z.

The holding tray 54 is configured to be removably inserted into the case 53. In this example, the holding tray 54 is drawn downstream in the transport direction Y from the case 53. The holding tray 54 is configured so that the liquid accommodation unit 52 can be set. In other words, the number of holding trays 54 corresponds to the number of liquid accommodation units 52. When the holding tray 54 is drawn out from the case 53, the liquid accommodation unit 52 is exposed. In this example, in the holding tray 54 is formed a through hole through which the liquid leaking from the liquid accommodation unit 52 drips.

The liquid accommodation unit 52 is configure to accommodate the liquid. The liquid accommodation unit 52 is a liquid pack obtained by sealing the liquid with a film, for example. When the liquid accommodation unit 52 is set on the holding tray 54, the liquid accommodation unit 52 is coupled to the recording unit 15. In this case, the liquid is supplied from the liquid accommodation unit 52 to the recording unit 15. When a residual amount of the liquid accommodated in the liquid accommodation unit 52 is a little, a user replaces the liquid accommodation unit 52. In this manner, the liquid is supplied from the liquid accommodation unit 52 to the recording device 11.

The liquids that are accommodated respectively in the plurality of liquid accommodation units 52 may be the liquids of the same type, or may be the liquids of different types. In this example, the plurality of liquid accommodation units 52 respectively accommodate the liquids of different types. Therefore, in this example, the recording device 11 uses eight types of liquids. The eight types of liquids are ink of colors different from one another, for example. When the recording device 11 holds six liquid accommodation units 52, the recording device 11 uses six types of liquids.

The holding unit 51 is located between the support unit 19 and the coupling frame 46 and between the first side frame 31 and the second side frame 32. More specifically, the holding unit 51 is located between the support unit 19 and the coupling frame 46 in the vertical direction Z. The holding unit 51 is located between the first side frame 31 and the second side frame 32 in the direction X.

In this example, the holding unit 51 is located between the base frame 29 and the coupling frame 46 and between the first side frame 31 and the second side frame 32. In other words, the holding unit 51 is located in the sectional region B1. In this manner, the region defined by the support unit 19, the first side frame 31, the second side frame 32, and the coupling frame 46, in other words, the sectional region B1 is utilized as an installation space for the holding unit 51.

When the holding unit 51 is installed in another space instead of the sectional region B1, an additional space for installing the holding unit 51 is required. Thus, there may be a risk of increasing the size of the recording device 11.

As illustrated in FIG. 1, the holding unit 51 is located between the first medium holding unit 23 and the second medium holding unit 24 in the transport direction Y. In other words, the holding unit 51 is located downstream of the first medium holding unit 23 in the transport direction Y. The holding unit 51 is positioned upstream of the second medium holding unit 24 in the transport direction Y. In this case, the holding unit 51 is settled between the first medium holding unit 23 and the second medium holding unit 24.

The holding unit 51 is located at a position different from the second medium holding unit 24 in the vertical direction Z. In this example, the holding unit 51 is located above the second medium holding unit 24. The holding unit 51 may be located below the second medium holding unit 24. With this, a user can easily access to the holding unit 51. In other words, for example, when a user replaces the liquid accommodation unit 52, the holding tray 54 is less likely to with the second medium holding unit 24.

The downstream end of the holding unit 51 is located upstream of and below the downstream end of the discharge support unit 21 in the transport direction Y. In this example, the downstream end of the holding unit 51 is located upstream in the transport direction Y and below the protrusion portion 22. In other words, the holding unit 51 does not extend downstream of the protrusion portion 22 in the transport direction Y. With this, there can be reduced a risk that the medium 99 hanging down after being discharged from the discharge support unit 21 is brought into contact with the holding unit 51.

As illustrated in FIG. 3, in this example, the holding unit 51 is attached to the coupling frame 46. Specifically, under a state of being placed on the coupling frame 46, the holding unit 51 is attached to the coupling frame 46. The holding unit 51 is attached to straddle the first beam frame 47 and the second beam frame 48. In this example, the two holding units 51 are mounted at an interval in the direction X. The two holding units 51 are arrayed in the direction X. In other words, the two holding units 51 are arrayed in the first direction X1 from the first side frame 31 to the second side frame 32.

The recording device 11 may include a liquid reception unit 56. The liquid reception unit 56 is located below the holding unit 51. In this example, the liquid reception unit 56 is attached to the coupling frame 46. The liquid reception unit 56 may be attached to the holding unit 51. The liquid reception unit 56 is only required to be located directly below the holding unit 51.

The liquid reception unit 56 is configured to receive the liquid dripping from the liquid accommodation unit 52. The liquid reception unit 56 is a tray that receives the liquid, for example. When the liquid leaks from the liquid accommodation unit 52, the liquid reception unit 56 receives the liquid. With this, there can be reduced a risk of spreading the leaking liquid outside the recording device 11. The liquid reception unit 56 may be configured as a tray that can be removably inserted into the case 53 in a similar manner to the holding tray 54.

The recording device 11 includes a pump unit 57. The pump unit 57 is a pump that supplies the liquid from the liquid accommodation unit 52 to the recording unit 15. For example, the pump unit 57 reduces a pressure in the liquid accommodation unit 52, and thus supplies the liquid to the recording unit 15.

As illustrated in FIG. 2, the pump unit 57 is located between the support unit 19 and the coupling frame 46 and between the first side frame 31 and the second side frame 32. More specifically, the pump unit 57 is located between the support unit 19 and the coupling frame 46 in the vertical direction Z. The pump unit 57 is located between the first side frame 31 and the second side frame 32 in the direction X.

In this example, the pump unit 57 is located between the base frame 29 and the coupling frame 46 and between the first side frame 31 and the second side frame 32. In other words, the pump unit 57 is located in the sectional region B1. In this manner, the region defined by the support unit 19, the first side frame 31, the second side frame 32, and the coupling frame 46, in other words, the sectional region B1 is utilized as an installation space for the pump unit 57.

The pump unit 57 is arrayed with the holding unit 51. The pump unit 57 is arrayed with the holding unit 51 in the direction X. In this example, the pump unit 57 is located between the two holding units 51.

The height of the pump unit 57 is equal to or less than the height of the holding unit 51. In other words, the length of the pump unit 57 in the vertical direction Z is equal to or less than the length of the holding unit 51 in the vertical direction Z. In this case, the pump unit 57 can be easily located in the region defined by the support unit 19, the first side frame 31, the second side frame 32, and the coupling frame 46.

Next, the functions and effects of the exemplary embodiment described above are described.

(1) The holding unit 51 is located between the support unit 19 and the coupling frame 46 and between the first side frame 31 and the second side frame 32. According to the above-mentioned configuration, the holding unit 51 is located in the region defined by the support unit 19, the first side frame 31, the second side frame 32, and the coupling frame 46. In other words, the region defined by the support unit 19, the first side frame 31, the second side frame 32, and the coupling frame 46 is not a dead space, but is utilized as an installation space for the holding unit 51. Therefore, increase of the size of the recording device 11 is suppressed.

(2) The holding unit 51 is located between the base frame 29 and the coupling frame 46 and between the first side frame 31 and the second side frame 32. According to the above-mentioned configuration, the holding unit 51 is located in the region defined by the base frame 29, the first side frame 31, the second side frame 32, and the coupling frame 46, in other words, the sectional region B1. In this manner, the sectional region B1 is not a dead space, but is utilized as an installation space for the holding unit 51.

(3) The holding unit 51 is attached to the coupling frame 46. According to the above-mentioned configuration, the posture of the holding unit 51 is stabilized.

(4) The pump unit 57 is located between the support unit 19 and the coupling frame 46 and between the first side frame 31 and the second side frame 32, and is arrayed with the holding unit 51 in a direction in which the first side frame 31 and the second side frame 32 are arrayed, in other words, the direction X. According to the above-mentioned configuration, the pump unit 57 is located in the region defined by the support unit 19, the first side frame 31, the second side frame 32, and the coupling frame 46. In this example, the pump unit 57 is located in the sectional region B1, similarly to the holding unit 51. In this manner, the region defined by the support unit 19, the first side frame 31, the second side frame 32, and the coupling frame 46 is not a dead space, but is utilized as an installation space for the pump unit 57.

(5) The plurality of holding units 51 are located to be arrayed from the first side frame 31 to the second side frame 32. According to the above-mentioned configuration, the plurality of holding units 51 are located in the region defined by the support unit 19, the first side frame 31, the second side frame 32, and the coupling frame 46. In this example, the two holding units 51 are located in the sectional region B1, similarly to the holding unit 51. In this manner, the region defined by the support unit 19, the first side frame 31, the second side frame 32, and the coupling frame 46 is not a dead space, but is utilized as an installation space for the plurality of holding units 51.

(6) The pump unit 57 is located between the support unit 19 and the coupling frame 46, between the first side frame 31 and the second side frame 32, and between the plurality of holding units 51. According to the above-mentioned configuration, the pump unit 57 is located in the region defined by the support unit 19, the first side frame 31, the second side frame 32, and the coupling frame 46. In this example, the pump unit 57 is located in the sectional region B1, similarly to the two holding units 51. In this manner, the region defined by the support unit 19, the first side frame 31, the second side frame 32, and the coupling frame 46 is not a dead space, but is utilized as an installation space for the pump unit 57.

(7) The height of the pump unit 57 is equal to or less than the height of the holding unit 51. According to the above-mentioned configuration, the pump unit 57 is located in the region defined by the support unit 19, the first side frame 31, the second side frame 32, and the coupling frame 46 more easily as compared to a case in which the height of the pump unit 57 is greater than the height of the holding unit 51.

(8) The leg unit 14 is in contact with an installation surface A1 on which the recording device 11 is installed. According to the above-mentioned configuration, the leg unit 14 stabilizes the posture of the recording device 11.

(9) The liquid reception unit 56 is configured to receive the liquid dripping from the liquid accommodation unit 52. According to the above-mentioned configuration, when the liquid leaks from the liquid accommodation unit 52 held by the holding unit 51, the liquid reception unit 56 receives the liquid. Therefore, there can be reduced a risk of spreading the leaking liquid.

(10) The holding unit 51 is located between the first medium holding unit 23 and the second medium holding unit 24 in the transport direction Y. According to the above-mentioned configuration, the holding unit 51 is settled between the first medium holding unit 23 and the second medium holding unit 24 in the transport direction Y. With this, increase of the size of the recording device 11 can be suppressed.

(11) The holding unit 51 is located at a position different from the second medium holding unit 24 in the vertical direction Z. According to the above-mentioned configuration, a user can access to the holding unit 51 more easily as compared to a case in which the holding unit 51 is located at the same position as the second medium holding unit 24 in the vertical direction Z.

(12) The downstream end of the holding unit 51 is located upstream of and below the downstream end of the discharge support unit 21 in the transport direction Y. According to the above-mentioned configuration, the holding unit 51 do not protrude downstream of the discharge support unit 21 in the transport direction Y. There can be reduced a risk that the medium 99 hanging down from the discharge support unit 21 is brought into contact with the holding unit 51.

(13) The holding unit 51 holds the plurality of liquid accommodation units 52 in a stacked state in the vertical direction Z. According to the above-mentioned configuration, when the liquid leaks from the liquid accommodation unit 52, a range to which the leaking liquid spreads can be reduced more, as compared to a case in which the plurality of liquid accommodation units 52 are arranged to be arrayed from the first side frame 31 to the second side frame 32.

(14) Each of the first side frame 31 and the second side frame 32 includes one or more box-like frames. According to the above-mentioned configuration, the box-like frame improves rigidity of the first side frame 31 and rigidity of the second side frame 32.

(15) An additional box-like frame may be provided to the box-like frame in the vertical direction Z. According to the above-mentioned configuration, more box-like frames are provided, the height of the first side frame 31 and the height of the second side frame 32 are increased. In other words, when more box-like frames are provided, the distance between the support unit 19 and the coupling frame 46 is increased. Therefore, more box-like frames are provided in accordance with the height of the holding unit 51, and thus the size of the region defined by the support unit 19, the first side frame 31, the second side frame 32, and the coupling frame 46 can be optimized.

The present exemplary embodiment described above may be modified as follows. The present exemplary embodiment and modification examples thereof to be described below may be implemented in combination within a range in which a technical contradiction does not arise.

Figure 4:
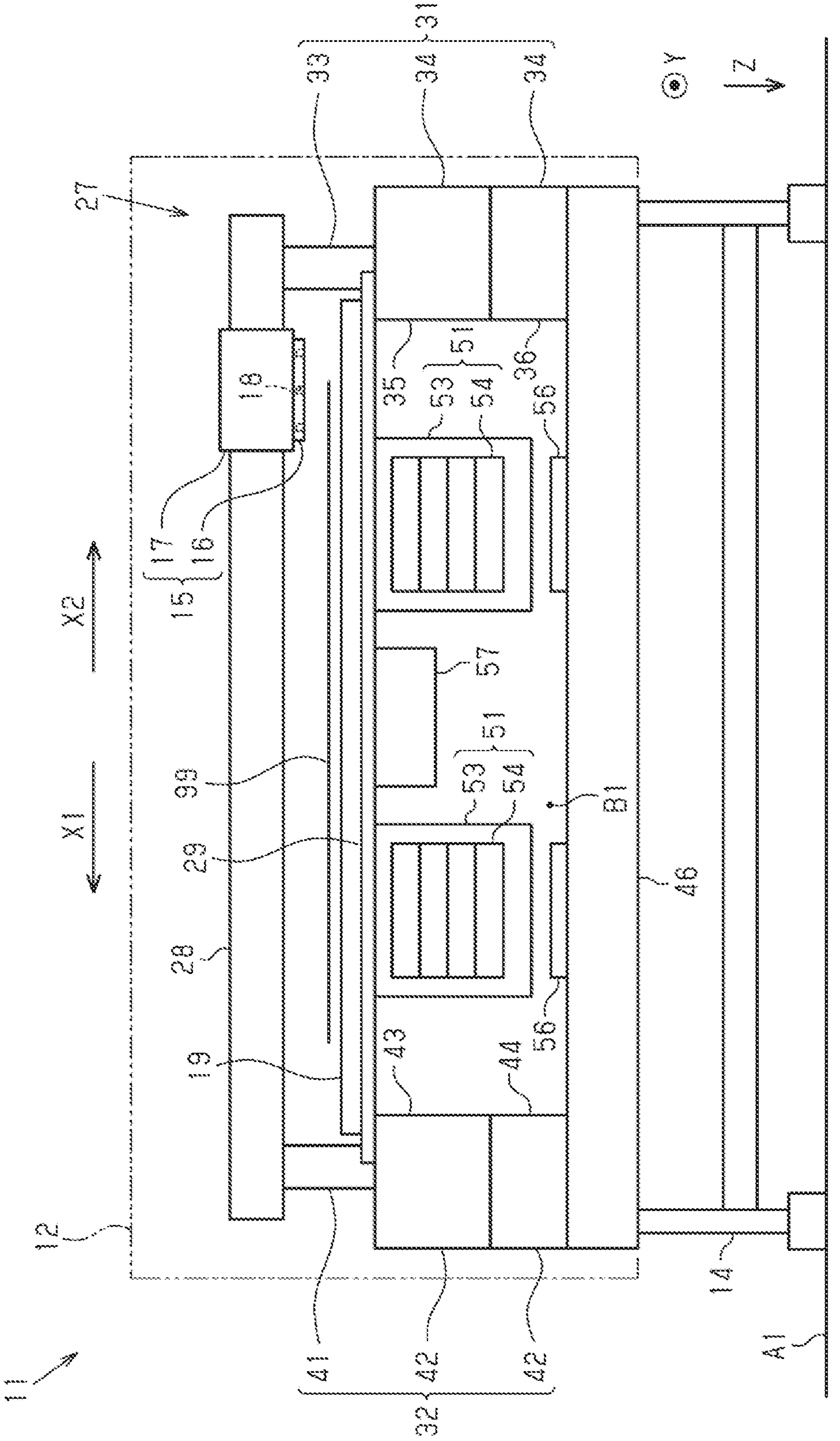
FIG. 4 is a front view illustrating the recording device in a first modification example.

As illustrated in FIG. 4, the holding unit 51 may be attached to the base frame 29. In this modification example, the holding unit 51 hangs down from the base frame 29. In this case, the holding unit 51 is also located between the support unit 19 and the coupling frame 46 and between the first side frame 31 and the second side frame 32.

As illustrated in FIG. 4, the pump unit 57 may be attached to the base frame 29. In this case, the pump unit 57 hangs downs from the base frame 29. In this case, the pump unit 57 is also located between the support unit 19 and the coupling frame 46 and between the first side frame 31 and the second side frame 32.

Figure 5:
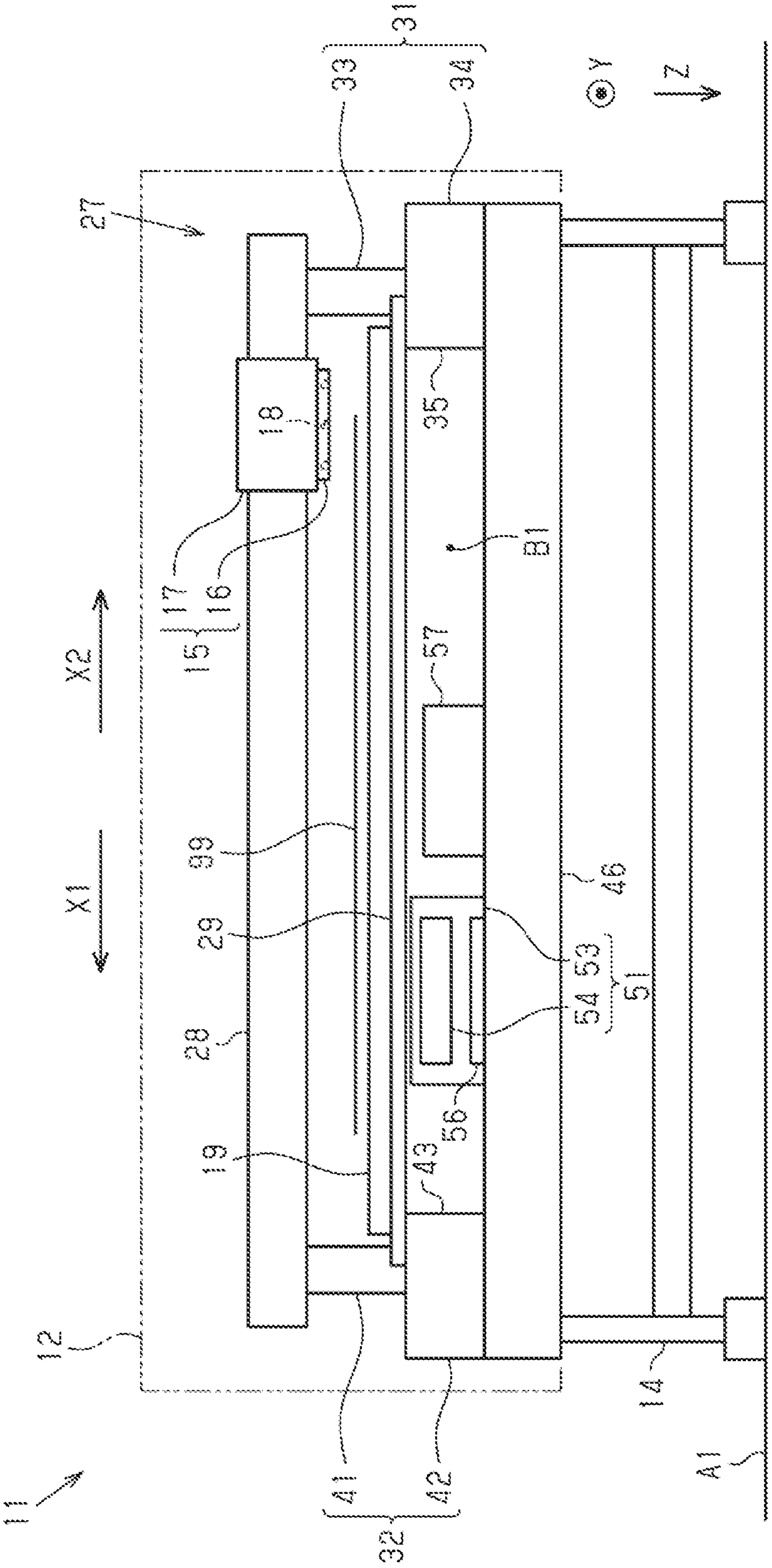
FIG. 5 is a front view illustrating the recording device in a second modification example.
Figure 6:
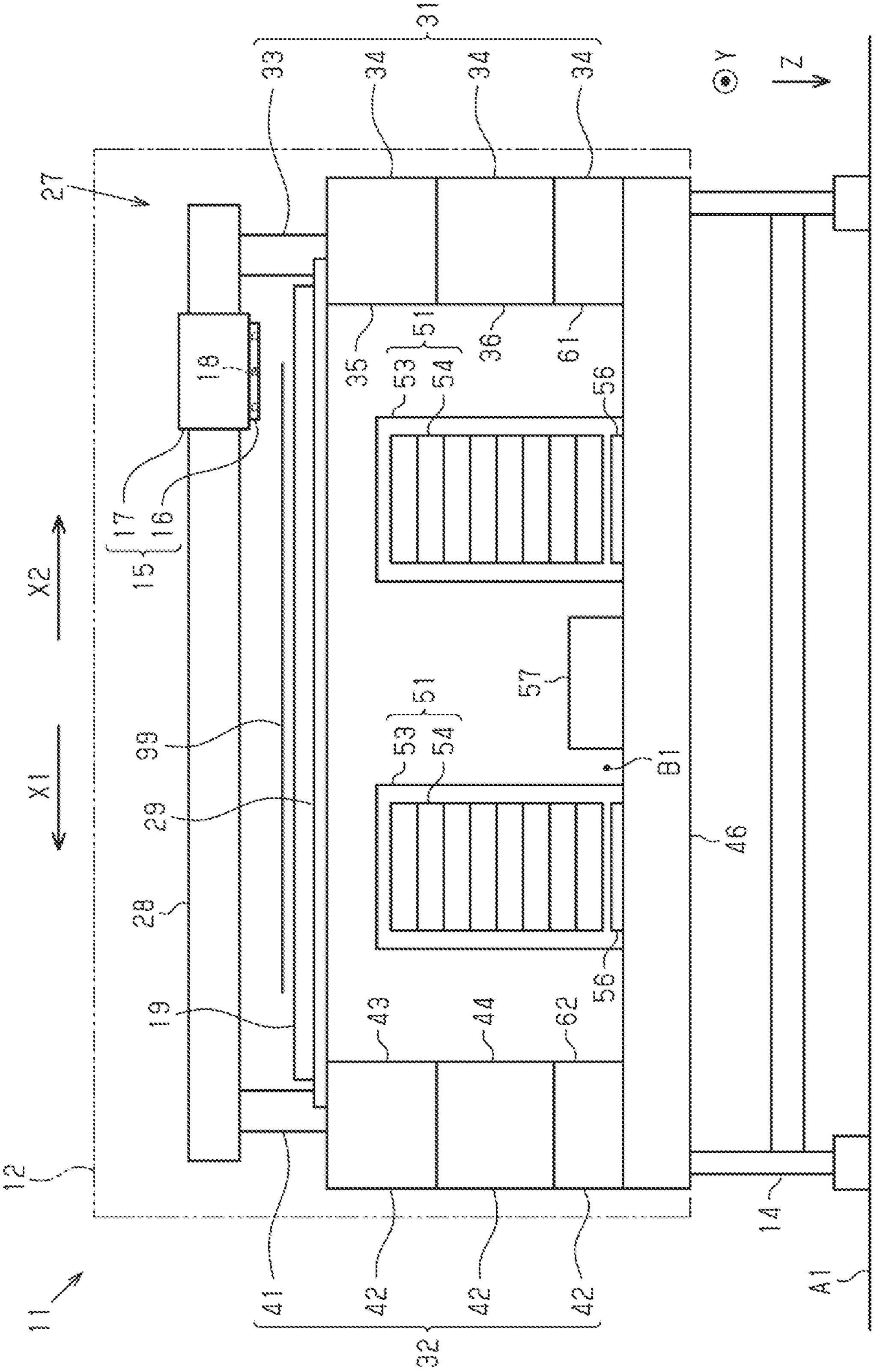
FIG. 6 is a front view illustrating the recording device in a third modification example.

As illustrated in FIG. 5 and FIG. 6, the number of box-like frames included in each of the first side frame 31 and the second side frame 32 may be one or three. The number of box-like frames may be four or more. In other words, the number of first bottom frames 34 included in the first side frame 31 may be one or three or more. The number of second bottom frames 42 included in the second side frame 32 may be one or three or more.

In the modification example illustrated in FIG. 5, the first side frame 31 includes the first primary bottom frame 35 as the first bottom frame 34. In the modification example illustrated in FIG. 5, the second side frame 32 includes the second primary bottom frame 43 as the second bottom frame 42. In the modification example illustrated in FIG. 6, the first side frame 31 includes the first primary bottom frame 35, the first secondary bottom frame 36, and a first tertiary bottom frame 61, as the first bottom frames 34. In the modification example illustrated in FIG. 6, the second side frame 32 includes the second primary bottom frame 43, the second secondary bottom frame 44, and a second tertiary bottom frame 62 as the second bottom frames 42.

The size of the sectional region B1 is changed in accordance with the number of box-like frames included in each of the first side frame 31 and the second side frame 32. Specifically, as the number of box-like frames included in each of the first side frame 31 and the second side frame 32 is increased, the distance between the support unit 19 and the coupling frame 46 is increased. In other words, as the number of first bottom frames 34 and the number of second bottom frames 42 are increased, the distance between the base frame 29 and the coupling frame 46 is increased. Therefore, as the number of first bottom frames 34 and the number of second bottom frames 42 are increased, the sectional region B1 is increased in size. In contrast, as the number of first bottom frames 34 and the number of second bottom frames 42 are decreased, the sectional region B1 is reduced in size.

When the holding unit 51 holds the liquid accommodation units 52 in a stacking manner, the height of the holding unit 51 is greater as the number of liquid accommodation units 52 is increased. Based on the description given above, in the recording device 11, the number of box-like frames is adjusted in accordance with the height of the holding unit 51, in other words, the number of liquid accommodation units 52 that can be held by the holding unit 51. With this, the size of the sectional region B1 can be minimized when the holding unit 51 is located in the sectional region B1. Therefore, there can be reducing a risk of increasing the size of the recording device 11.

As illustrated in FIG. 5, the recording device 11 may be provided with one holding unit 51. In this modification example, the pump unit 57 is also arrayed side by side with the holding unit 51 in the direction X.

In the first side frame 31, the first top frame 33 and the first bottom frame 34 may be integrated with each other.

In the second side frame 32, the second top frame 41 and the second bottom frame 42 may be integrated with each other.

The liquid ejected by the recording unit 15 is not limited to ink, and may be, for example, a liquid material including particles of a functional material dispersed or mixed in liquid. For example, the recording unit 15 may eject a liquid material including a material such as an electrode material or a pixel material used in manufacture of a liquid crystal display, an electroluminescent display, and a surface emitting display in a dispersed or dissolved form.

Hereinafter, technical concepts and effects thereof that are understood from the above-described exemplary embodiment and the modification example are described.

(A) A recording device is a recording device receiving liquid supplied from a liquid accommodation unit configured to accommodate the liquid, the recording device including: a recording unit configured to eject the liquid onto a medium being transported to perform printing on the medium; a support unit configured to support the medium at a position facing the recording unit; a first side frame configured to support one end side of the support unit; a second side frame configured to support another end side of the support unit; a coupling frame configured to couple the first side frame and the second side frame to each other; and one or more holding units configured to hold one or more of the liquid accommodation units, wherein the coupling frame is located below the support unit, and the one or more holding units are located between the support unit and the coupling frame and between the first side frame and the second side frame.

According to the above-mentioned configuration, the holding unit is located in the region defined by the support unit, the first side frame, the second side frame, and the coupling frame. In other words, the region defined by the support unit, the first side frame, the second side frame, and the coupling frame is not a dead space, but is utilized as an installation space for the holding unit. Therefore, increase of the size of the recording device is suppressed.

(B) The recording device described above may include a base frame being located below the support unit and being configured to support the support unit, wherein the first side frame and the second side frame support both ends of the base frame, respectively, to support the support unit, and the one or more holding units are located between the base frame and the coupling frame and between the first side frame and the second side frame.

According to the above-mentioned configuration, the holding unit is located in the region defined by the base frame, the first side frame, the second side frame, and the coupling frame. In other words, the region defined by the base frame, the first side frame, the second side frame, and the coupling frame is not a dead space, but is utilized as an installation space for the holding unit.

(C) In the recording device described above, the one or more holding units are attached to the coupling frame.

According to the above-mentioned configuration, the posture of the holding unit is stabilized.

(D) The recording device described above may include a pump unit configured to supply the liquid from the liquid accommodation unit toward the recording unit, wherein the pump unit is located between the support unit and the coupling frame and between the first side frame and the second side frame, and is arrayed with the one or more holding units in a direction in which the first side frame and the second side frame are arrayed.

According to the above-mentioned configuration, the pump unit is located in the region defined by the support unit, the first side frame, the second side frame, and the coupling frame. In other words, the region defined by the support unit, the first side frame, the second side frame, and the coupling frame is not a dead space, but is utilized as an installation space for the pump unit.

(E) The recording device described above may include a plurality of holding units as the one or more holding units, wherein the plurality of holding units are located to be arrayed from the first side frame to the second side frame.

According to the above-mentioned configuration, the plurality of holding units are located in the region defined by the support unit, the first side frame, the second side frame, and the coupling frame. In other words, the region defined by the support unit, the first side frame, the second side frame, and the coupling frame is not a dead space, but is utilized as an installation space for the plurality of holding units.

(F) The recording device described above may include a pump unit configured to supply the liquid from the liquid accommodation unit toward the recording unit, wherein the pump unit is located between the support unit and the coupling frame, between the first side frame and the second side frame, and between the plurality of holding units.

According to the above-mentioned configuration, the pump unit is located in the region defined by the support unit, the first side frame, the second side frame, and the coupling frame. In other words, the region defined by the support unit, the first side frame, the second side frame, and the coupling frame is not a dead space, but is utilized as an installation space for the pump unit.

(G) In the recording device described above, a height of the pump unit is equal to or less than a height of the holding unit.

According to the above-mentioned configuration, the pump unit is located in the region defined by the support unit, the first side frame, the second side frame, and the coupling frame more easily as compared to a case in which the height of the pump unit is greater than the height of the holding unit.

(H) The recording device described above may include a leg unit being attached to the first side frame and the second side frame, wherein the leg unit is in contact with an installation surface on which the recording device is installed. According to the above-mentioned configuration, the leg unit stabilizes the posture of the recording device.

(I) The recording device described above may include a liquid reception unit being located below the one or more holding units, wherein the liquid reception unit is configured to receive the liquid dripping from the liquid accommodation unit.

According to the above-mentioned configuration, when the liquid leaks from the liquid accommodation unit held by the holding unit, the liquid reception unit receives the liquid. Therefore, there can be reduced a risk of spreading the leaking liquid.

(J) The recording device described above may include a first medium holding unit configured to hold, in a roll shape, a medium before recording performed by the recording unit; and a second medium holding unit configured to hold, in a roll shape, a medium after recording performed by the recording unit, wherein the one or more holding units are located between the first medium holding unit and the second medium holding unit in a transport direction of the medium on the support unit.

According to the above-mentioned configuration, the holding unit is settled between the first medium holding unit and the second medium holding unit in the transport direction. With this, increase of the size of the recording device can be suppressed.

(K) In the recording device described above, the one or more holding units are located at a position different from the second medium holding unit in a vertical direction.

According to the above-mentioned configuration, a user can access to the holding unit more easily as compared to a case in which the holding unit is located at the same position as the second medium holding unit in the vertical direction.

(L) The recording device described above may include a discharge support unit configured to support the medium after recording performed by the recording unit, wherein a downstream end of the one or more holding units is located upstream of and below the downstream end of the discharge support unit in a transport direction of the medium on the support unit.

According to the above-mentioned configuration, the holding unit do not protrude downstream of the discharge support unit in the transport direction. There can be reduced a risk that the medium hanging down from the discharge support unit is brought into contact with the holding unit.

(M) The recording device described above may include a plurality of liquid accommodation units as the one or more liquid accommodation units, wherein the one or more holding units hold the plurality of liquid accommodation units in a stacked state in a vertical direction.

According to the above-mentioned configuration, when the liquid leaks from the liquid accommodation unit, a range to which the leaking liquid spreads can be reduced more, as compared to a case in which the plurality of liquid accommodation units are arranged to be arrayed from the first side frame to the second side frame.

(N) In the recording device described above, each of the first side frame and the second side frame includes one or more box-like frames.

According to the above-mentioned configuration, the box-like frame improves rigidity of the first side frame and rigidity of the second side frame.

(O) In the recording device described above, the box-like frame is configured to be mounted with an additional box-like frame in the vertical direction.

According to the above-mentioned configuration, more box-like frames are provided, the height of the first side frame and the height of the second side frame are increased. In other words, when more box-like frames are provided, the distance between the support unit and the coupling frame is increased. Therefore, more box-like frames are provided in accordance with the height of the holding unit, and thus the size of the region defined by the support unit, the first side frame, the second side frame, and the coupling frame can be optimized.

What is claimed is:

1. A recording device receiving liquid supplied from a liquid accommodation unit configured to accommodate the liquid, the recording device comprising:

a recording unit configured to eject the liquid onto a medium being transported to perform printing on the medium;

a support unit configured to support the medium at a position facing the recording unit;

a first side frame configured to support one end side of the support unit;

a second side frame configured to support another end side of the support unit;

a coupling frame configured to couple the first side frame and the second side frame to each other, the coupling frame comprising a first beam frame and a second beam frame, the first side frame and the second side frame being sandwiched between the first beam frame and the second beam frame in a transport direction of the medium being transported past the recording unit; and one or more holding units configured to hold one or more of the liquid accommodation units, wherein the coupling frame is located below the support unit, and the one or more holding units are located between the support unit and the coupling frame and between the first side frame and the second side frame.

2. The recording device according to claim 1, comprising a base frame being located below the support unit and being configured to support the support unit, wherein the first side frame and the second side frame support both ends of the base frame, respectively, to support the support unit, and the one or more holding units are located between the base frame and the coupling frame and between the first side frame and the second side frame.

3. The recording device according to claim 1, wherein the one or more holding units are attached to the coupling frame.

4. The recording device according to claim 1, comprising a pump unit configured to supply the liquid from the liquid accommodation unit toward the recording unit, wherein the pump unit is located between the support unit and the coupling frame and between the first side frame and the second side frame, and is arrayed with the one or more holding units in a direction in which the first side frame and the second side frame are arrayed.

5. The recording device according to claim 4, wherein a height of the pump unit is equal to or less than a height of the holding unit.

6. The recording device according to claim 1, comprising a plurality of the holding units as the one or more holding units, wherein the plurality of holding units are located to be arrayed from the first side frame to the second side frame.

7. The recording device according to claim 6, comprising a pump unit configured to supply the liquid from the liquid accommodation unit toward the recording unit, wherein the pump unit is located between the support unit and the coupling frame, between the first side frame and the second side frame, and between the plurality of holding units.

8. The recording device according to claim 1, comprising a leg unit being attached to the first side frame and the second side frame, wherein the leg unit is in contact with an installation surface on which the recording device is installed.

9. The recording device according to claim 1, comprising a liquid reception unit located below the one or more holding units, wherein the liquid reception unit is configured to receive the liquid dripping from the liquid accommodation unit.

10. The recording device according to claim 1, comprising a first medium holding unit configured to hold, in a roll shape, a medium before recording performed by the recording unit; and a second medium holding unit configured to hold, in a roll shape, a medium after recording performed by the recording unit, wherein the one or more holding units are located between the first medium holding unit and the second medium holding unit in a transport direction of the medium on the support unit.

11. The recording device according to claim 10, wherein the one or more holding units are located at a position different from the second medium holding unit in a vertical direction.

12. The recording device according to claim 1, comprising a discharge support unit configured to support the medium after recording performed by the recording unit, wherein a downstream end of the one or more holding units is located upstream of and below the downstream end of the discharge support unit in a transport direction of the medium on the support unit.

13. The recording device according to claim 1, comprising a plurality of the liquid accommodation units as the one or more liquid accommodation units, wherein the one or more holding units hold the plurality of liquid accommodation units in a stacked state in a vertical direction.

14. The recording device according to claim 1, wherein each of the first side frame and the second side frame includes one or more box-like frames.

15. The recording device according to claim 14, wherein the box-like frame is configured to be mounted with an additional box-like frame in the vertical direction.

* * * * *